(12) United States Patent
Wingett et al.

(10) Patent No.: US 12,486,126 B2
(45) Date of Patent: Dec. 2, 2025

(54) SEALS FOR DOCK LEVELLING SYSTEMS, METHODS OF SEALING GAPS IN DOCK LEVELLING SYSTEMS, AND METHODS OF ARRANGING SEALS FOR DOCK LEVELLING SYSTEMS FOR STORAGE OR TRANSPORTATION

(71) Applicant: RENTOKIL INITIAL 1927 PLC, Camberley (GB)

(72) Inventors: Gary Wingett, Southampton (GB); Mark Brown, Prestatyn (GB); Robert Shand, Copthrone (GB)

(73) Assignee: Rentokil Initial 1927 PLC, Camberley (GB)

( * ) Notice: Subject to any disclaimer, the term of this patent is extended or adjusted under 35 U.S.C. 154(b) by 217 days.

(21) Appl. No.: 17/796,049

(22) PCT Filed: Jan. 20, 2021

(86) PCT No.: PCT/GB2021/050117
§ 371 (c)(1),
(2) Date: Jul. 28, 2022

(87) PCT Pub. No.: WO2021/152289
PCT Pub. Date: Aug. 5, 2021

(65) Prior Publication Data
US 2023/0059666 A1    Feb. 23, 2023

(30) Foreign Application Priority Data

Jan. 29, 2020   (GB) ..................................... 2001230

(51) Int. Cl.
*B65G 69/00*     (2006.01)
*A01M 29/30*     (2011.01)
(Continued)

(52) U.S. Cl.
CPC ........... *B65G 69/008* (2013.01); *A01M 29/30* (2013.01); *B65G 69/2876* (2013.01);
(Continued)

(58) Field of Classification Search
CPC ........................ B65G 69/008; B65G 69/2876; B65G 69/287; A01M 29/30; E06B 7/2316; E06B 7/2301
(Continued)

(56) References Cited

U.S. PATENT DOCUMENTS

| 712,240 | A |  | 10/1902 | Barnes et al. |
| 2,102,578 | A | * | 12/1937 | Gail ...................... E06B 7/2318 49/499.1 |

(Continued)

FOREIGN PATENT DOCUMENTS

| DE | 202007012985 U1 | * | 3/2009 | ............. B65D 85/16 |
| EP | 2986544 A1 |  | 2/2016 | |

(Continued)

OTHER PUBLICATIONS https://web.archive.org/web/20190120133538/http://www.em-flex.eu/pages/eng/products/l-serie-voor-docklevellers.php EM-Flex L-Series for Dock Levelers Jan. 20, 2019 (Year: 2019).*
(Continued)

*Primary Examiner* — Omar F Hijaz
(74) *Attorney, Agent, or Firm* — Buchanan Ingersoll & Rooney PC

(57) ABSTRACT

A seal for a dock levelling system including a movable ramp arranged within a recess. The seal is for sealing a gap between a side of the movable ramp and a wall of the recess, and including a flexible strip formed of a flexible material, and on each longitudinal edge of the flexible strip, an attachment strip for attaching the flexible strip to the side of the movable ramp. The seal is arranged so that when the attachment strips are attached adjacently to each other to the (Continued)

side of the movable ramp, the material of the flexible strip between the attachment strips forms a closed loop extending out from the side of the movable ramp to the wall of the recess, to seal the gap between the side of the movable ramp and the wall of the recess.

13 Claims, 9 Drawing Sheets

(51) Int. Cl.
*B65G 69/28* (2006.01)
*E06B 7/23* (2006.01)

(52) U.S. Cl.
CPC .......... *B65G 69/287* (2013.01); *E06B 7/2301* (2013.01); *E06B 7/2316* (2013.01)

(58) Field of Classification Search
USPC .... 14/69.5, 71.1, 71.3, 71.5, 73.5; 52/173.2, 52/393, 394, 396.02–396.9, 396.1, 402
See application file for complete search history.

(56) References Cited

U.S. PATENT DOCUMENTS

| | | | | |
|---|---|---|---|---|
| 3,255,478 | A * | 6/1966 | Lambert | B65G 69/2823 14/71.7 |
| 3,448,543 | A * | 6/1969 | Multer | E06B 7/2314 49/470 |
| 3,456,274 | A * | 7/1969 | Mcguire | B65G 69/2876 14/71.7 |
| 3,854,257 | A * | 12/1974 | Lobel | B65G 69/008 52/173.2 |
| 4,018,017 | A * | 4/1977 | Schoop | E04D 13/151 52/468 |
| 4,307,974 | A * | 12/1981 | George | E01D 19/06 14/73.1 |
| 4,928,340 | A * | 5/1990 | Alexander | B65G 69/287 14/71.3 |
| 5,442,825 | A | 8/1995 | Hahn et al. | |
| 6,502,268 | B2 * | 1/2003 | Ashelin | B65G 69/2876 14/71.1 |
| 6,654,976 | B2 | 12/2003 | Digmann et al. | |
| 7,877,831 | B2 * | 2/2011 | Digmann | B65G 69/2876 14/71.1 |
| 8,510,888 | B2 | 8/2013 | Eungard | |
| 8,590,087 | B2 | 11/2013 | Swessel et al. | |
| 8,800,086 | B1 | 8/2014 | Borgerding | |
| 8,800,217 | B1 * | 8/2014 | Miller | E04B 7/022 52/79.9 |
| 9,604,799 | B2 | 3/2017 | Kowk | |
| 9,694,996 | B2 | 7/2017 | Kikstra et al. | |
| 9,771,754 | B2 * | 9/2017 | Lewan | E06B 7/22 |
| 10,329,834 | B2 * | 6/2019 | Mertinooke | E06B 7/2301 |
| 2004/0128943 | A1 | 7/2004 | Herbert | |
| 2005/0086868 | A1 * | 4/2005 | Santelli | E06B 7/2316 49/499.1 |
| 2009/0165224 | A1 | 7/2009 | Digmann et al. | |
| 2010/0064606 | A1 * | 3/2010 | Devalapura | E06B 9/02 52/202 |
| 2010/0313535 | A1 * | 12/2010 | Crook | B01D 46/0004 428/34.1 |
| 2014/0250788 | A1 | 9/2014 | Schild et al. | |
| 2016/0096696 | A1 | 4/2016 | Colbert | |

FOREIGN PATENT DOCUMENTS

| | | |
|---|---|---|
| EP | 3403955 A1 | 11/2018 |
| GB | 2511722 A | 9/2014 |
| WO | 2014170289 A1 | 10/2014 |

OTHER PUBLICATIONS

EM-Flex-L (https://web.archive.org/web/20201230101347/https://EM-Flex-L.eu/en/emflex-gap-seals/gap-sealing-for-lifting-platforms-levellers/ Dec. 30, 2020 Publication) Dec. 30, 2020 (Year: 2020).*
C-Mech: "Introducing Em-Flex Dock Leveller & Door Seals", Nov. 25, 2015, retrieved from the Internet Apr. 8, 2021: URL:https://c-mech.co.uk/introducing-em-flex-seals-for-industrial-doors-dock-levellers/, 4 pages.
Elite Garage Floor: "Xcluder RodentBlock Dock Leveler Seal Kit", Mar. 31, 2019, retrieved from the Internet Apr. 8, 2021: URL:https://www.elitegaragefloors.com/rodentblock-8-dock-leveler-seal-kit-set-of-2/, 4 pages.
Em-Flex Weatherseals: "Em-Flex Easy Magnetic Installation", YouTube, Feb. 1, 2015, retrieved from the Internet Apr. 8, 2021: URL:https://www.youtube.com/watch?v=D41r5DohHf0, 3 pages.
Em-Flex Weatherseals: "Em-Flex L-Series", YouTube, Nov. 23, 2015, retrieved from the Internet Apr. 8, 2021: URL:https://www.youtube.com/watch?v=-4VW67ler68, 2 pages.
Em-Flex: "Em-Flex L-Series for Dock Levelers", Jan. 20, 2019, retrieved from the Internet Apr. 8, 2021: https://web.archive.org/web/2019012013 3538/http://www.em-flex.eu/pages/eng/products/1-serie-door-docklevellers.php, 7 pages.
Great Britain Search Report for Great Britain Application No. GB2001230.8, dated Jun. 4, 2020, 3 pages.
International Preliminary Report on Patentability for International Application No. PCT/GB2021/050117, dated Jul. 28, 2022, 8 pages.
International Search Report and Written Opinion for International Application No. PCT/GB2021/050117, dated Apr. 23, 2021, 12 pages.
Pawling Engineered Products, "Pneuma-Seal", Sep. 28, 2012, pawlingep.com, retrieved from the Internet Apr. 9, 2021, 24 pages.

* cited by examiner

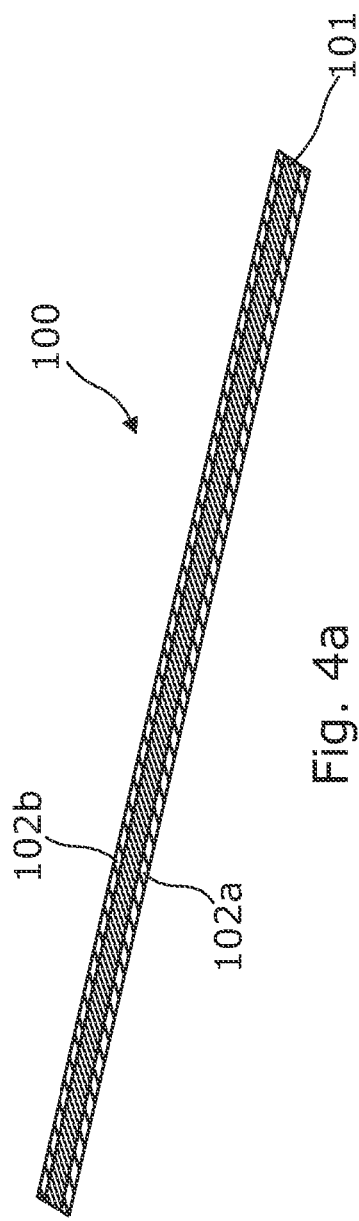
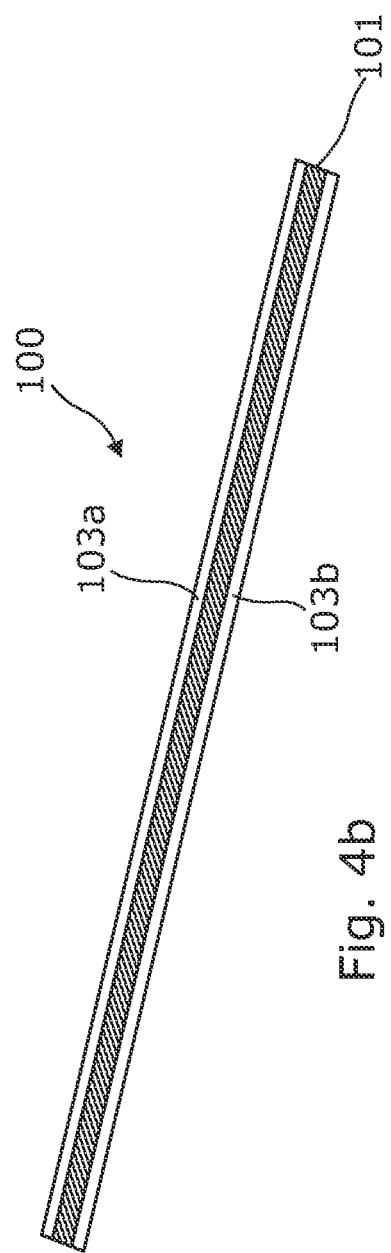

SEALS FOR DOCK LEVELLING SYSTEMS, METHODS OF SEALING GAPS IN DOCK LEVELLING SYSTEMS, AND METHODS OF ARRANGING SEALS FOR DOCK LEVELLING SYSTEMS FOR STORAGE OR TRANSPORTATION

CROSS REFERENCE TO RELATED APPLICATIONS

This application is a U.S. National Phase application of PCT International Application No. PCT/GB2021/050117, filed Jan. 20, 2021, which claims the benefit of GB Application No. 2001230.8, filed Jan. 29, 2020, both of which are incorporated by reference herein in their entireties for all purposes.

FIELD OF THE INVENTION

The present invention concerns seals for dock levelling systems, methods of sealing gaps in dock levelling systems, and methods of arranging seals for dock levelling systems for storage or transportation. More particularly, but not exclusively, the invention concerns seals for sealing gaps between levellers of dock levelling systems and the walls of the recesses in which they are mounted, to prevent the entry of unwanted pests such as rodents or the like

BACKGROUND OF THE INVENTION

A typical dock levelling system is described with reference to FIGS. 1 to 3. As shown in FIG. 1, the dock levelling system comprises a leveller 1 comprising a frame 2 on which is mounted a movable ramp 3. The ramp 3 has side panels 3a and 3b, and is hinged to the frame 2 at the rear 4 of the leveller 1. The ramp 3 can be moved up and down by a drive mechanism 5, which operates a piston 5a mounted to the frame 2 and the underneath of the ramp 3.

As shown in FIG. 2, the dock levelling system further comprises a recess 10 in a floor surface 13, the recess 10 having a rear wall 11 and side walls 12a and 12b.

FIG. 3 shows the dock levelling system 15 comprising the leveller 1 mounted within the recess 10. As can be seen, the leveller 1 effectively provides a portion of the floor surface 13 that can be moved up and down as required, and may for example be used as part of a loading bay for loading or unloading a heavy goods vehicle or the like.

It is a disadvantage of such dock levelling systems that there will be gaps between the side panels 3a and 3b of the ramp 3 of the leveller 1 and the side walls 12a and 12b of the recess 10. Such gaps can allow the entry of unwanted pests such as rodents or the like.

EP 2986544 A1 published 24 Feb. 2016 discloses a gap seal for a loading ramp, with a magnetic carrier strip to which is attached a surface element with an essentially omega-shaped cross-section. It is a disadvantage of this gap seal that it is complex to construct, and once constructed the essentially omega-shaped cross-section of the surface element means it is bulky and difficult to store or transport. Further, it is not effective to stop pests such as rodents, as they will simply chew through the surface element.

The present invention seeks to mitigate the above-mentioned problems. Alternatively and/or additionally, the present invention seeks to provide improved seals for dock levelling systems, methods of sealing gaps in dock levelling systems, and methods of arranging seals for dock levelling systems for storage or transportation.

SUMMARY OF THE INVENTION

In accordance with a first aspect of the invention there is provided a seal for a dock levelling system comprising a movable ramp arranged within a recess, wherein the seal is for sealing a gap between a side of the movable ramp and a wall of the recess, the seal comprising:
  a flexible strip formed of a flexible material;
  on each longitudinal edge of the flexible strip, an attachment strip for attaching the flexible strip to the side of the movable ramp;
  wherein the seal is arranged so that when the attachment strips are attached adjacently to each other to the side of the movable ramp, the material of the flexible strip between the attachment strips forms a closed loop extending out from the side of the movable ramp to the wall of the recess, to seal the gap between the side of the movable ramp and the wall of the recess.

By having the seal comprise attachment strips it can be attached using those to the side of the movable ramp, and when the attachment strips are positioned adjacently the flexible strip between the adjacent strips will form the closed loop that extend across the gap to touch the wall of the recess, so sealing the gap. As the closed loop is formed of flexible material, it can change shape if required, in particular being pushed flatter by the wall of the recess so that it fits the gap exactly. However, as the attachment is provided by having the two separate attachment strips on the longitudinal edges of the flexible strip, and the closed loop is only formed when the attachment strips are positioned adjacent to each other, prior to use the seal can be kept in a flat form prior to be use, making it easier to store and transport, and also easier to initially construct.

The flexible material may be a textile. The flexible material may be woven. The flexible material may be a mesh, may be a wire mesh, and may be a metal wire mesh. Advantageously the flexible material is Kevlar. Kevlar provides a suitably flexible and resilient material to form the seal, but is also very tough so provides a good barrier against damage by rodents or the like, in particular damage by chewing.

Preferably, each attachment strip is a magnetic strip. This makes the seal easy to position in place, and to adjust or remove if required. Alternatively, each attachment strip may an adhesive strip, or other suitable attaching means.

Advantageously, each attachment strip is discontinuous longitudinally. Advantageously, discontinuities in a first attachment strip of the attachment strips are aligned longitudinally with discontinuities in the second attachment strip of the attachment strips. Advantageously, the seal is arranged for storage or transportation, and the flexible strip is folded transversely at one or more discontinuities in the attachment strips. This reduces the length of the seal, making storage, transportation or the like easier.

The seal may be arranged for storage or transportation, and the flexible strip folded longitudinally along the material of the textile strip between the attachment strips. This reduces the width of the seal, making storage, transportation or the like easier.

In accordance with a second aspect of the invention there is provided a dock levelling system comprising a movable ramp arranged within a recess, wherein there is a gap between a side of the movable ramp and a wall of the recess, the dock levelling system further comprising a seal as described above, wherein the attachment strips of the seal are attached adjacently to each other to the side of the movable ramp, so that the material of the flexible strip between the attachment strips forms a closed loop extending out from the side of the movable ramp to the wall of the recess, to seal the gap between the side of the movable ramp and the wall of the recess.

In accordance with a third aspect of the invention there is provided a method of sealing a gap in a dock levelling system using a seal as above, wherein the dock levelling system comprises a movable ramp arranged within a recess, and wherein the gap is between a side of the movable ramp and a wall of the recess, the method comprising the steps of:

attaching a first attachment strip of the attachment strips to the side of the movable ramp;

attaching the second attachment strip of the attachment strips to the side of the movable ramp adjacent to the first attachment strip, so that the material of the flexible strip between the attachment strips forms a closed loop extending out from the side of the movable ramp to the wall of the recess, to seal the gap between the side of the movable ramp and the wall of the recess.

In accordance with a fourth aspect of the invention there is provided a method of arranging a seal as described above where each attachment strip is discontinuous longitudinally, for storage or transportation, comprising the step of folding the flexible strip of the seal transversely at one or more discontinuities in the attachment strips.

The method may further comprise the step of folding the flexible strip of the seal longitudinally along the material of the flexible strip between the attachment strips. The longitudinal fold may be done before or after the transverse fold.

In accordance with a fifth aspect of the invention there is provided a method of arranging a seal as described above for storage or transportation, comprising the step of folding the flexible strip of the seal longitudinally along the material of the flexible strip between the attachment strips.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 4a shows a top side of a seal in accordance with a first embodiment of the invention;

FIG. 4b shows the bottom side of the seal of the first embodiment;

DETAILED DESCRIPTION

Figure 1:
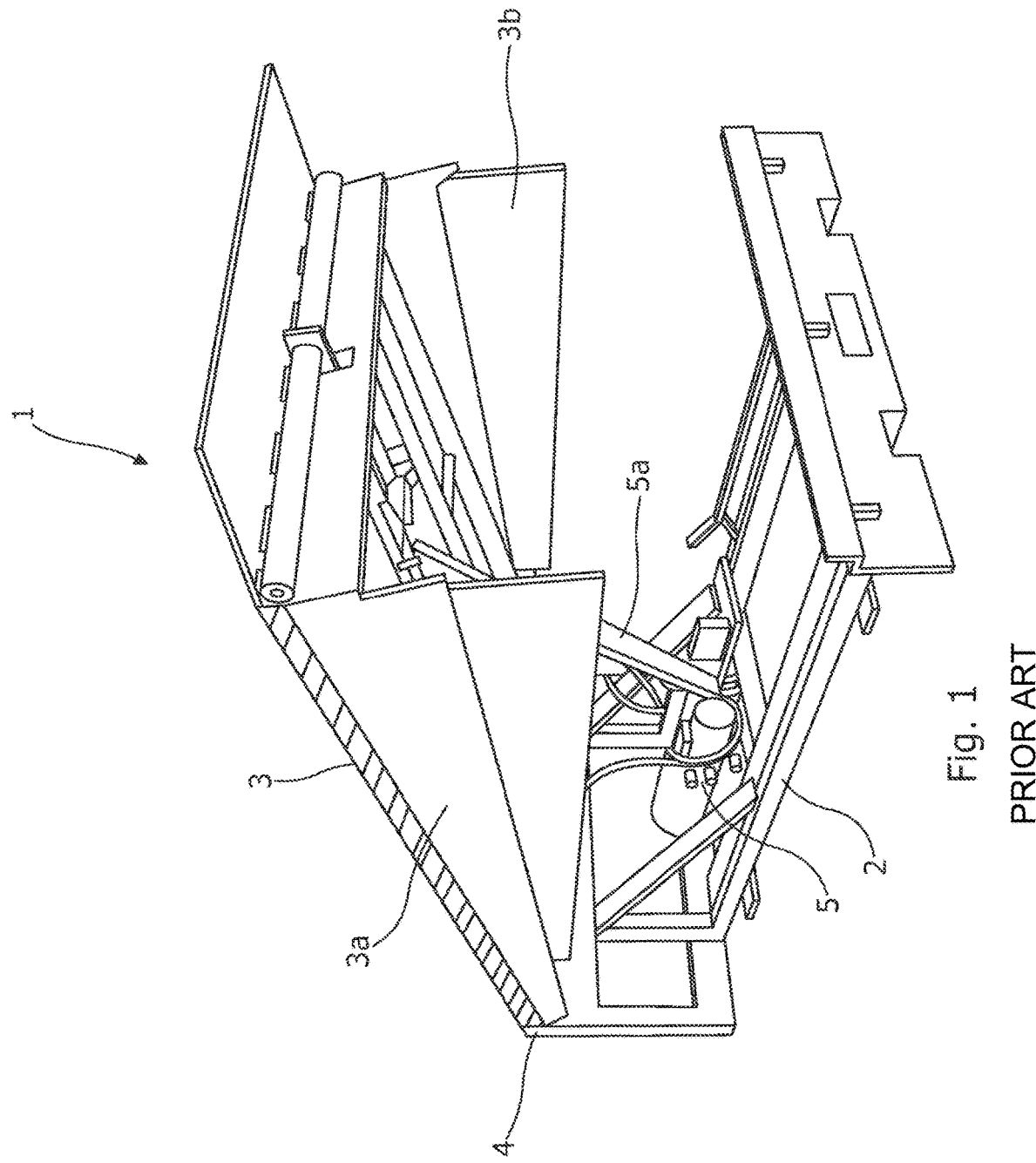
FIG. 1 shows a leveller of a known dock levelling system.

A seal for a dock levelling system in accordance with a first embodiment of the invention is now described with reference to FIGS. 4a to 9b.

FIG. 4a shows the top side of the seal 100. The seal 100 comprises a flexible strip 101 comprised of woven Kevlar. The flexible strip is 145 cm side and 2400 cm long, but it will be appreciated that many other dimensions of flexible strip could be used in other embodiments of the invention.

On the longitudinal edges of the top side of the flexible strip 101 are hazard strips 102a and 102b, which are 25 cm in width and run the length of the flexible strip 101, so are 2400 cm in length. The hazard strips 102a and 102b are formed of adhesive-backed plastic, and so are attached to the flexible strip 101 by their adhesive backing.

FIG. 4b shows the bottom side of the seal 100. On the longitudinal edges of the bottom side of the flexible strip 101 are magnetic strips 103a and 103b, which are 25 cm in width and run the length of the flexible strip 101. Thus, the magnetic strips 103a and 103b are in the same position as, but on the opposite side of the flexible strip 101 to, the hazard strips 102a and 102b. The magnetic strips 103a and 103b are attached to the flexible strip 101 by respective adhesive strips, discussed in more detail below.

Figure 5:
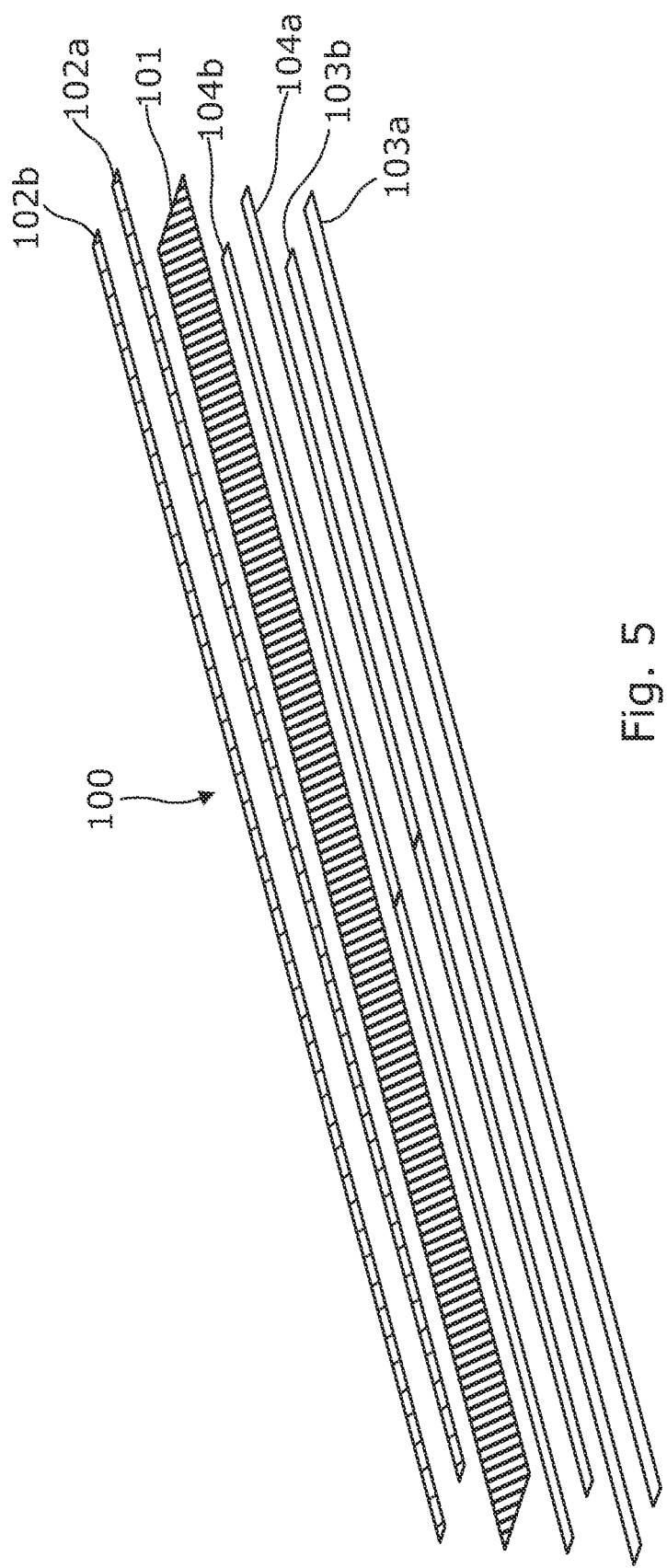
FIG. 5 is an exploded view of the seal of the first embodiment.

FIG. 5 is an exploded view of the seal 100, showing the flexible strip 101, hazard strips 102a and 102b, magnetic strips 103a and 103b, and adhesive strips 104a and 104b which are the adhesive strips that attach the magnetic strips 103a and 103b to the flexible strip 101. It can be seen from FIG. 5 that the adhesive strips 104a and 105b are split at the longitudinal mid-point of the seal 100. While it cannot be seen from the figures, the magnetic strips 103a and 103b are also split at the longitudinal mid-point of the seal 100, as explained in more detail below.

It will be appreciated that the hazard strips 102a and 102b, and/or magnetic strips 103a and 103b, may be fixed to the flexible strip 101 by other means, such as being sewn onto the flexible strip 101.

Figure 6:
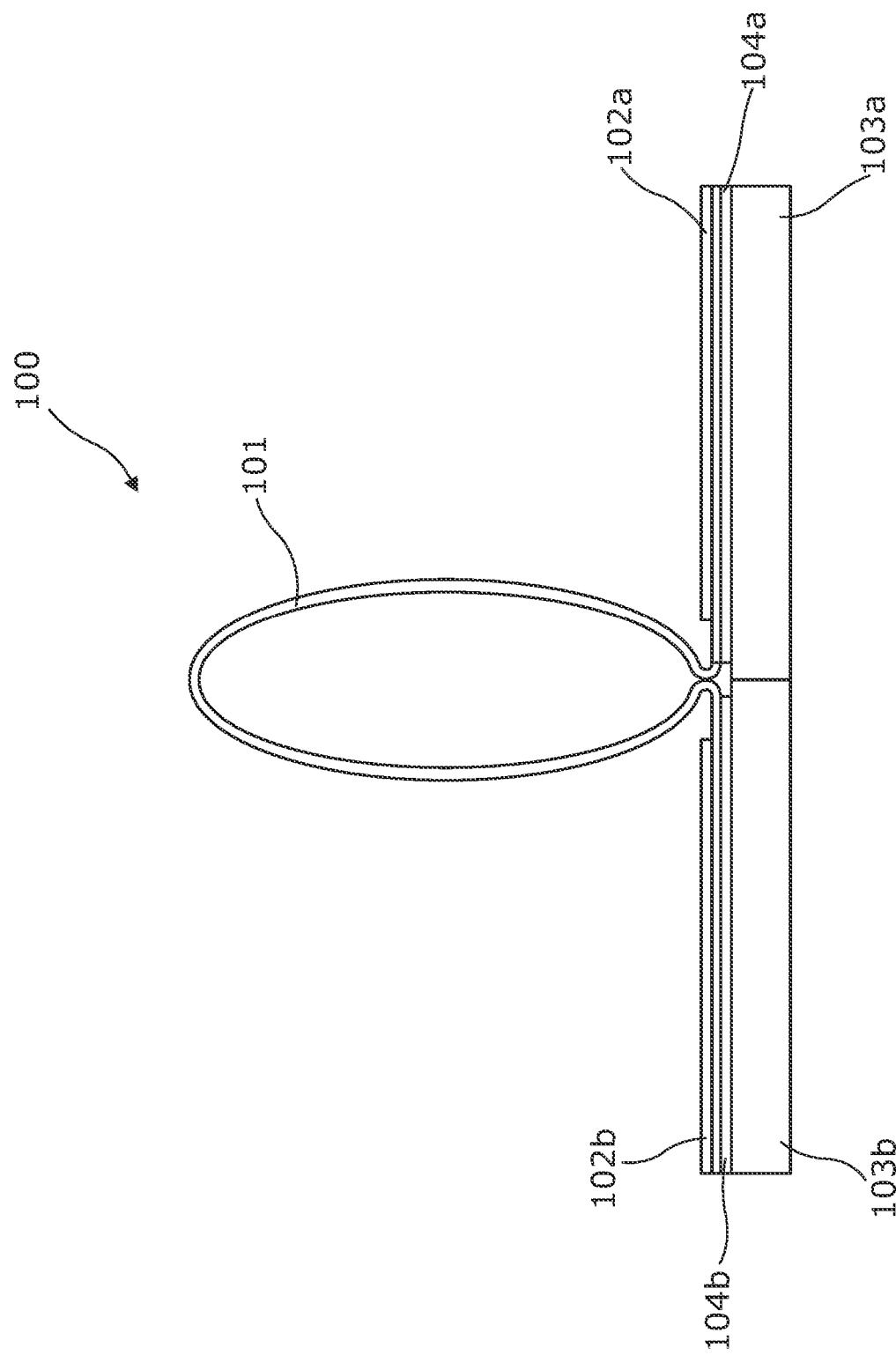
FIG. 6 is a cross-sectional view of the seal of the first embodiment arranged for mounting on a leveller.
Figure 7:
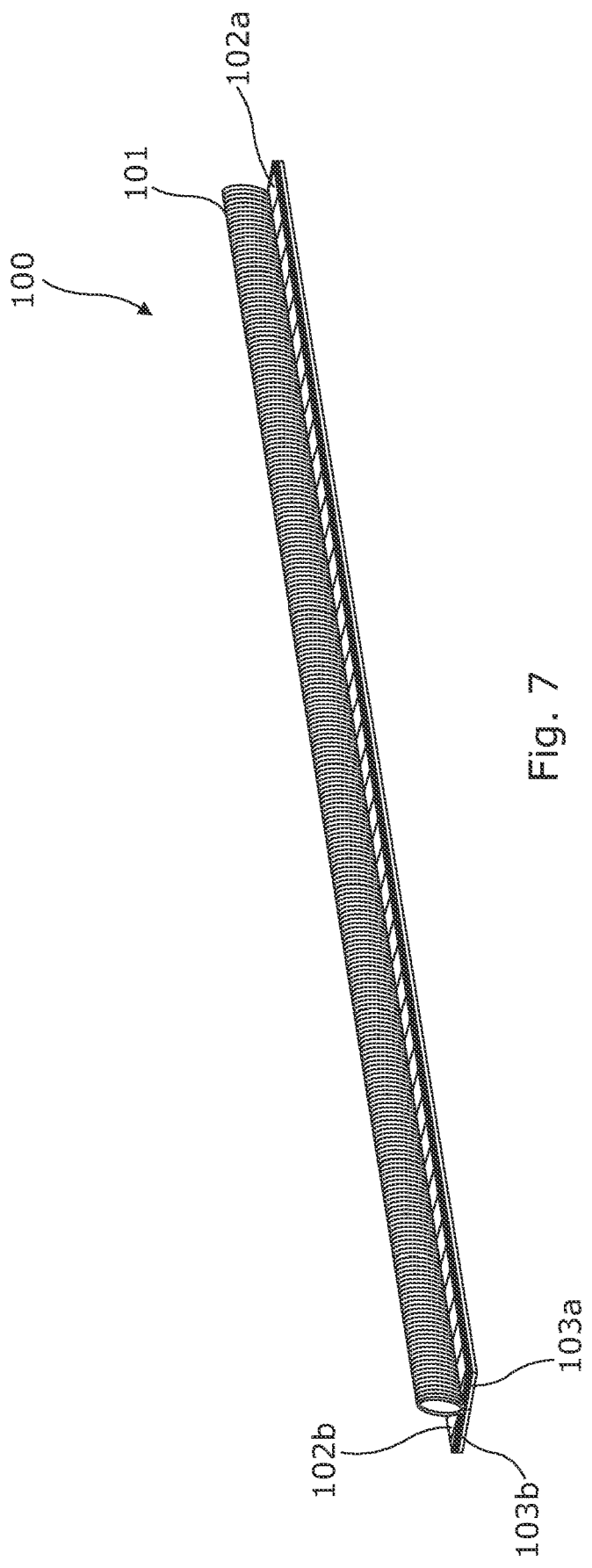
FIG. 7 is a perspective view of the seal of the first embodiment arranged for mounting on a leveller.

FIGS. 6 and 7 show the seal 100 arranged for mounting on the leveller 1. As can be seen, the magnetic strips 103a and 103b are positioned adjacent to each other, so that their faces opposite the flexible strip 101 together form a rectangle 50 cm by 2400 cm. This causes the part of the flexible strip 101 between the magnetic strips 103a and 103b to form a closed loop extending away from the magnetic strips 103a and 103b, with the hazard strips 102a and 102b on either side of the closed loop.

Figure 2:
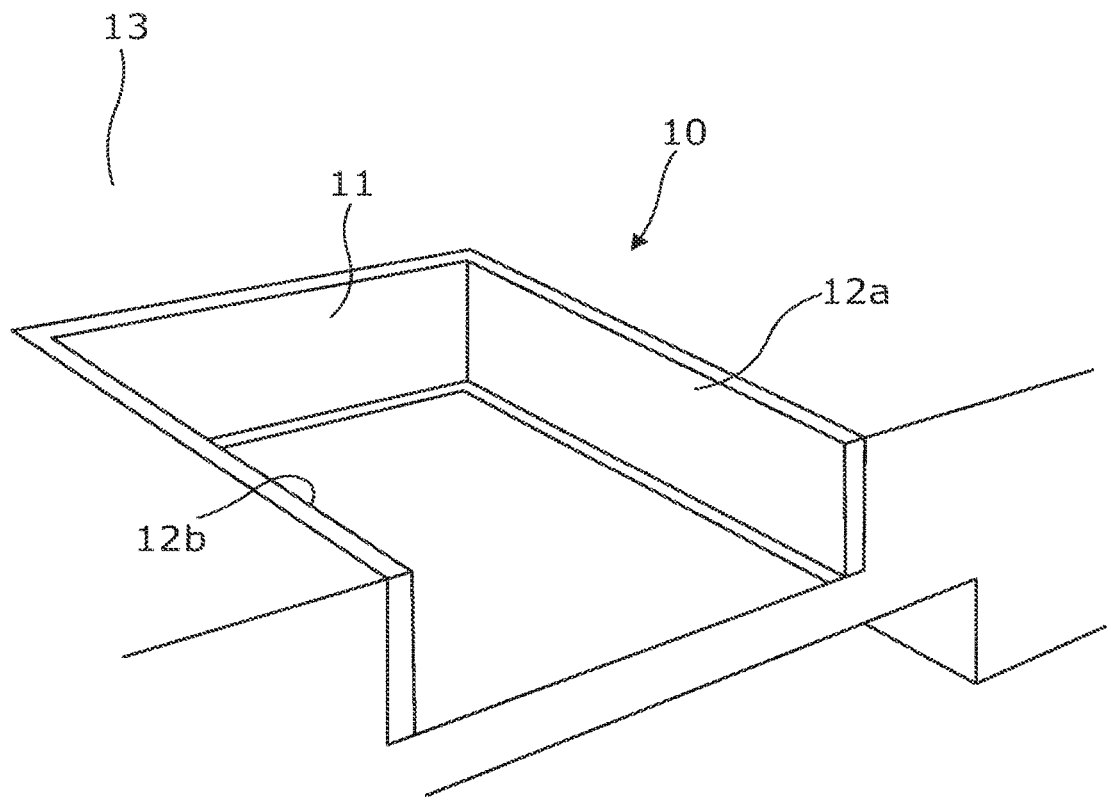
FIG. 2 shows a recess of a known dock levelling system.
Figure 3:
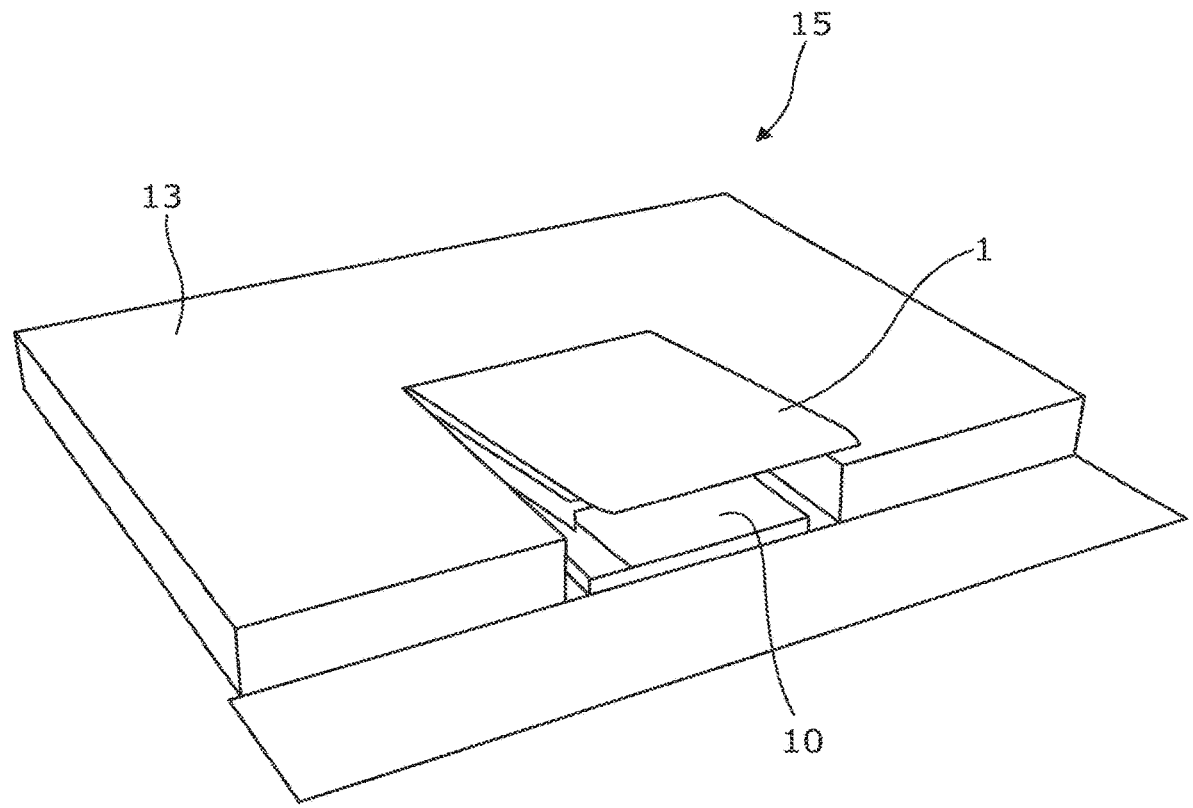
FIG. 3 shows the leveller of FIG. 1 mounted in the recess of FIG. 2.
Figure 8:
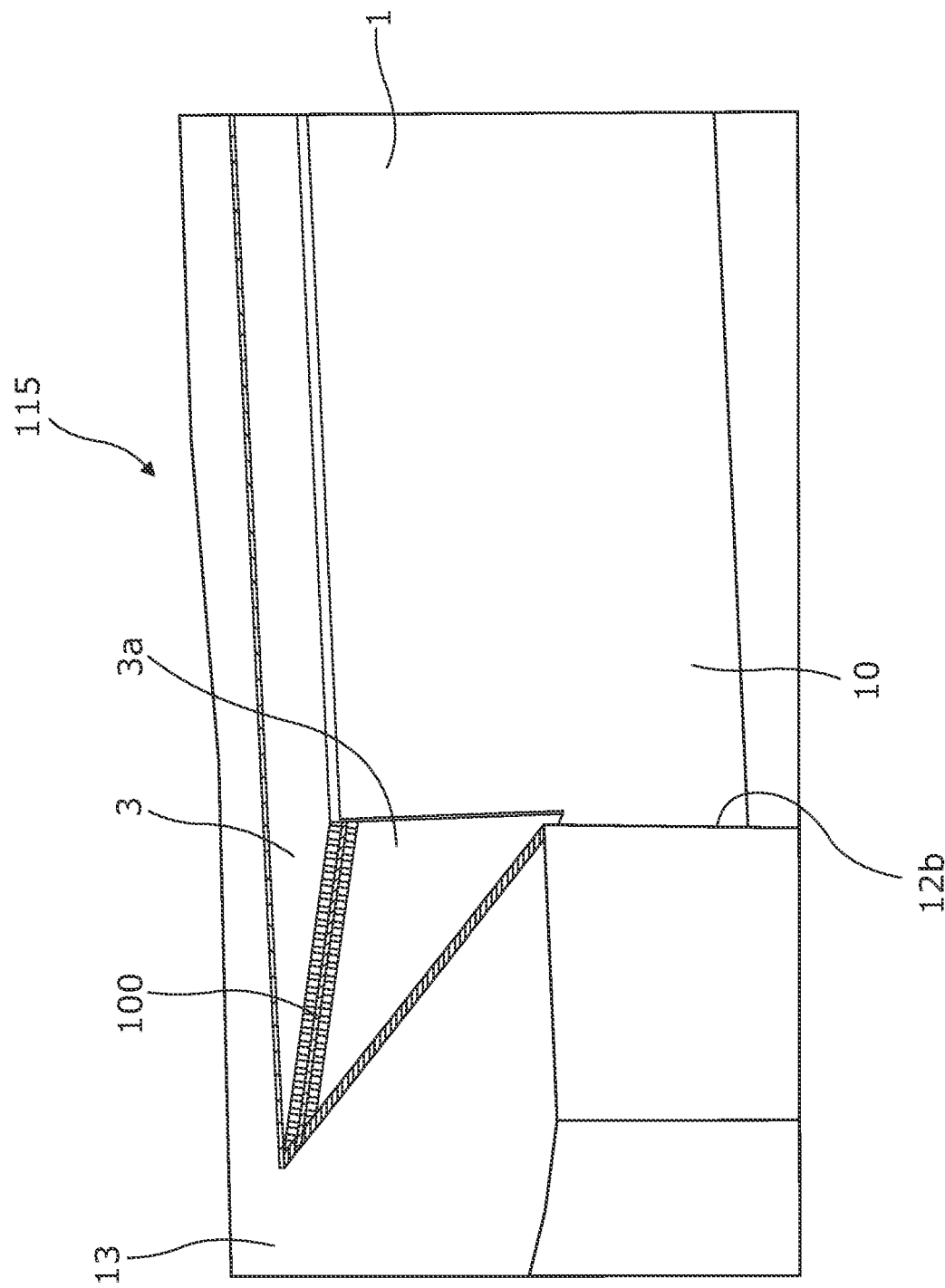
FIG. 8 shows the seal of the first embodiment mounted on a leveller.

FIG. 8 shows a dock levelling system 115 in accordance with an embodiment of the invention, which incorporates the seal 100. The dock levelling system 115 is as in FIGS. 1 to 3, so comprising a leveller 1 mounted in a recess 10. However, as can be seen, the seal 100 is mounted at the top edge of the side panel 3a of the ramp 3 of the leveller 1, with the magnetic strips 103a and 103b touching the surface of side panel 3a and so holding the seal 100 in place by magnetic force. The closed loop of flexible strip 101 on the opposite side of the seal 100 to the magnetic strips 103a and 103b then extends away from the side panel 3a towards the wall 12b of the recess 10.

Thus, it can be seen that when the ramp 3 is lowered, the outer end of the closed loop of flexible strip 101 will touch the wall 12b, and in this way the seal 100 seals the gap between the leveller 1 and the wall 12b. As the closed loop of the flexible strip 101 is made of a flexible material, it is able to move to fit exactly the size of the gap, in particular due to the wall 12b pushing it towards the side panel 3a. The seal 100 thus creates a barrier of the Kevlar of the flexible strip 101 in the gap. Advantageously, and unlike conventional materials such as rubber, plastics or the like, the Kevlar is sufficiently tough that it cannot be chewed through by a pest such as a rodent, and so provides an effective seal.

However, as can also be seen, prior to the magnetic strips 103a and 103b being attached to the side panel 3a and the closed loop of the seal being formed, the seal can be kept in a flat form prior to be used, making it easier to construct, store and transport.

It will be appreciated that when installing the seal 100 on the side panel 3a if the leveller 1, the magnetic strips 103a and 103b do not need to be positioned next to each other prior to attaching to the side panel 3a. Rather, a first magnetic strip 103a can be attached while the seal 100 is still in flat form, and then the second magnetic strip 103b subsequently placed adjacent to the first magnetic strip 103a, to form the closed loop.

It will also be appreciated that in use it is likely that a further seal identical to the seal 100 will be positioned in a corresponding position on the opposite side panel 3b of the ramp 3, to seal the gap between the side panel 3b and the opposite side wall 12a of the recess.

Figure 9A:
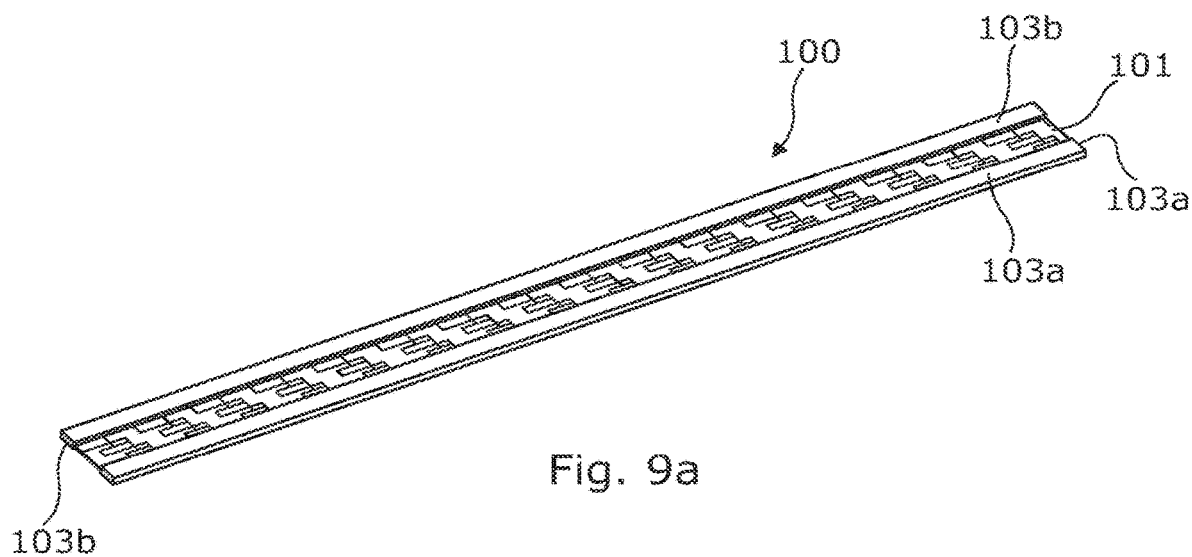
FIG. 9a shows the seal of the first embodiment folded for storage or transportation.
Figure 9B:
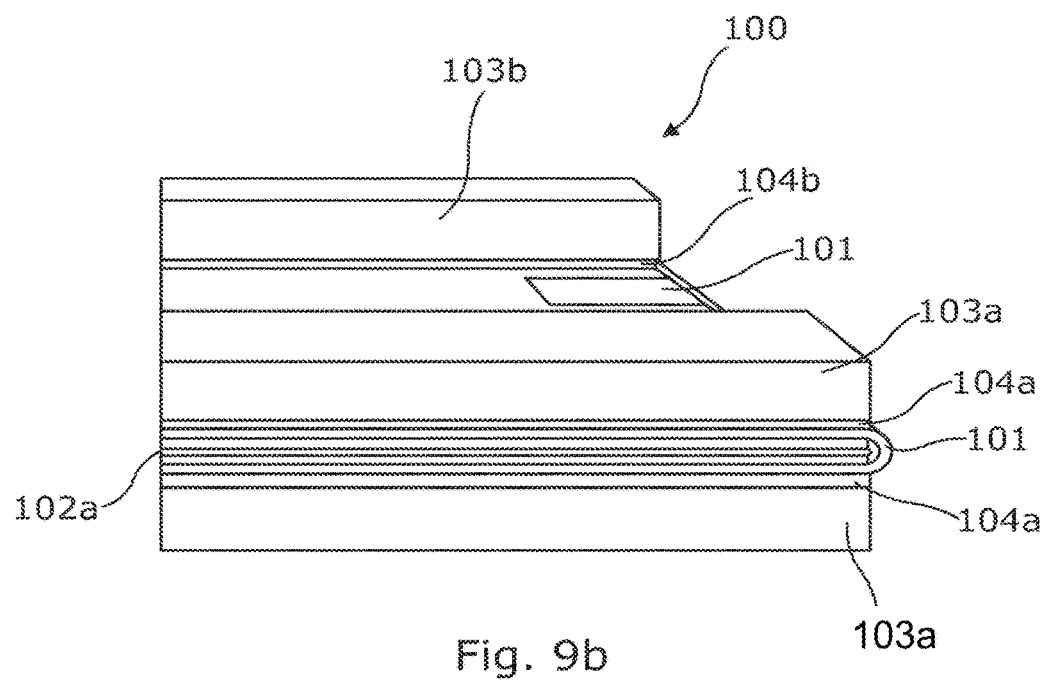
FIG. 9b is a close-up view of the mid-portion of the seal of the first embodiment folded for storage or transportation.

FIGS. 9a and 9b show the seal 100 folded for storage or transportation. As discussed above, both the adhesive strips 104a and 104b and the magnetic strips 103a and 103b are split into two parts at the longitudinal midpoint of the seal 100. FIGS. 9a and 9b show the seal 100 folded transversely at this midpoint, so that the magnetic strips 103a and 103b are on the outside, and the hazard strips 102a and 102b are on the inside. Thus, the seal 100 can easily be folded to have a smaller length, so 1200 cm in this case, making storage or transportation of the seal 100 much easier.

The seal 100 may be folded longitudinally along the portion of the flexible strip 101 between the magnetic strips 103a and 103b. This may be done as well or instead of folding the seal 100 transversely, and before or after folding the seal 100 transversely.

It will be appreciated that in other embodiments of the invention there may be further and/or differently placed discontinuities in the magnetic strips 103a and 103b, in particular to allow it to be folded more times, for example three, four or more times.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A seal for a dock levelling system comprising a movable ramp arranged within a recess, wherein the seal is for sealing a gap between a side of the movable ramp and a wall of the recess, the seal comprising:
   a flexible strip formed of a flexible material having a length;
   on each longitudinal edge of the flexible strip, respective attachment strips for attaching the flexible strip to the side of the movable ramp, wherein the seal is configurable to move between a flat state, in which the attachment strips are separated relative to each other by the flexible material of the flexible strip between the attachment strips, and the flexible material of the flexible strip between the attachment strips do not form a closed loop, and a sealed state;
   wherein in the sealed state, the seal is arranged so that the attachment strips are attached adjacently to each other and to the side of the movable ramp, and the material of the flexible strip between the attachment strips forms a closed loop extending out from the side of the movable ramp to the wall of the recess, to seal the gap between the side of the movable ramp and the wall of the recess; and
   wherein each attachment strip includes a discontinuity, such that each attachment strip is discontinuous along the length of the flexible strip, and wherein at least the flexible strip is configured to be folded transversely relative to the length of the flexible strip at the discontinuity when the seal is in the flat state, thereby reducing the length of at least the flexible strip; and
   wherein at least the flexible strip is folded longitudinally along the material of the flexible strip between the attachment strips.

2. The seal according to claim 1, wherein the flexible material is Kevlar.

3. The seal according to claim 1, wherein each attachment strip is a magnetic strip.

4. The seal according to claim 1, wherein each attachment strip is an adhesive strip.

5. The seal according to claim 1, wherein when the seal is arranged for storage or transportation, the flexible strip is folded transversely at the discontinuity in the attachment strips.

6. The seal according to claim 1, wherein when the seal is arranged for storage or transportation, the flexible strip is folded longitudinally along the material of the flexible strip between the attachment strips.

7. A method of sealing a gap in a dock levelling system using the seal according to claim 1, wherein the dock levelling system comprises a movable ramp arranged within a recess, and wherein the gap is between a side of the movable ramp and a wall of the recess, the method comprising the steps of:
   attaching a first attachment strip of the attachment strips to the side of the movable ramp;
   attaching the second attachment strip of the attachment strips to the side of the movable ramp and adjacent to the first attachment strip, thereby sealing the gap between the side of the movable ramp and the wall of the recess.

8. A method of arranging the seal according to claim 1, wherein when the attachment strips are in the flat state, the seal is arranged for storage or transportation, the method comprising: folding the flexible strip of the seal transversely at the discontinuity in the attachment strips; and folding the flexible strip of the seal longitudinally along the material of the flexible strip between the attachment strips.

9. The seal according to claim 1, wherein each attachment strip is discontinuous longitudinally.

10. The seal according to claim 9, wherein the discontinuity in a first attachment strip of the attachment strips are aligned longitudinally with the discontinuity in a second attachment strip of the attachment strips.

11. The seal according to claim 9, wherein when the attachment strips are in the flat state, the seal is arranged for storage or transportation.

12. The seal according to claim 11, wherein the discontinuity comprises at least two discontinuities which are evenly spaced apart and distributed longitudinally along the attachment strips.

13. The seal according to claim 12, wherein the at least two discontinuities in a first attachment strip are aligned longitudinally with the at least two discontinuities in a second attachment strip.

\* \* \* \* \*